United States Patent [19]

Selim

[11] 4,356,521

[45] Oct. 26, 1982

[54] MAGNETIC TAPE POSITION DISPLAY SYSTEM FOR A SOUND REPRODUCTION SYSTEM

[75] Inventor: Harold N. Selim, Wichita, Kans.

[73] Assignee: A. H. Hunt, III, Wichita, Kans.; a part interest

[21] Appl. No.: 86,164

[22] Filed: Oct. 18, 1979

[51] Int. Cl.³ .................. G11B 13/04; G11B 27/34
[52] U.S. Cl. .................................. 360/72.2; 360/137
[58] Field of Search ............... 360/137, 72.1, 72.2, 360/74.6, 27; 340/675

[56] References Cited

U.S. PATENT DOCUMENTS

| | | | |
|---|---|---|---|
| 2,782,398 | 2/1957 | West et al. | 360/72.2 |
| 3,192,509 | 6/1965 | Durand et al. | |
| 3,237,951 | 3/1966 | Kimberlin et al. | |
| 3,344,416 | 9/1967 | Harford | |
| 3,376,564 | 4/1968 | Holland | |
| 3,423,743 | 1/1969 | Silverman | 360/72.1 |
| 3,573,360 | 4/1971 | Rose, Jr. | 360/137 |
| 3,681,524 | 8/1972 | Nicholls | |
| 3,728,685 | 4/1973 | Stalnert | |
| 3,739,086 | 6/1973 | Heather | |
| 3,812,538 | 5/1974 | Stone, Jr. et al. | |

Primary Examiner—Glen R. Swann, III
Attorney, Agent, or Firm—Woodard, Weikart, Emhardt & Naughton

[57] ABSTRACT

Magnetic recording tape has groups of coded marks which successively identify successive portions of the tape. An optical reader is positioned to read the marks on the tape as the tape travels through the sound reproduction system, and a decoder decodes the marks and identifies, in numerical form, the specific portion of the tape which is in position for sound reproduction. The system has the capability of identifying the specific portion of the tape in position for sound reproduction irrespectively of the speed or direction of travel of the tape within the system, or the position of the tape when operation of the system is initiated.

1 Claim, 6 Drawing Figures

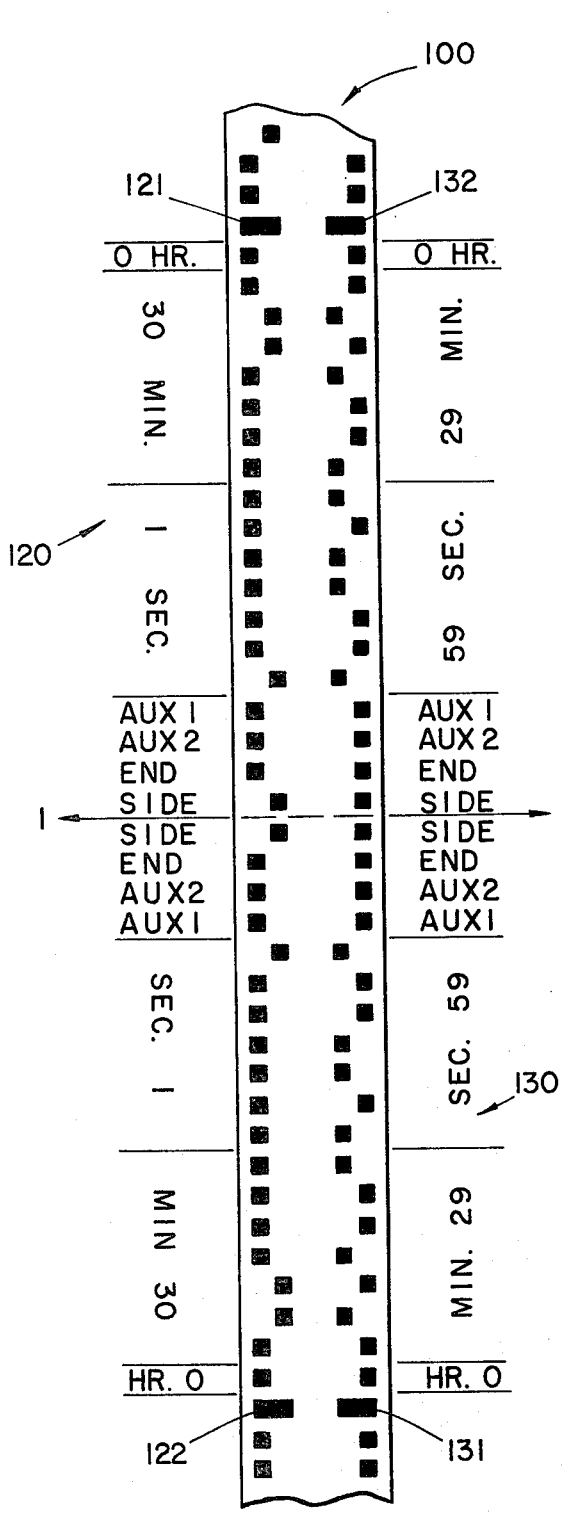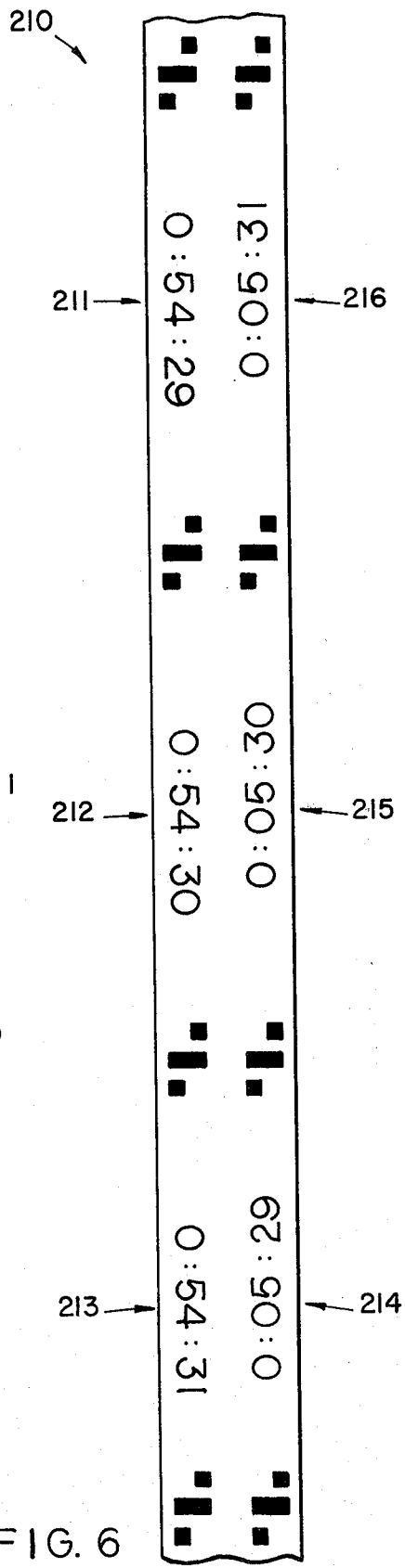
FIG. 5
FIG. 6

MAGNETIC TAPE POSITION DISPLAY SYSTEM FOR A SOUND REPRODUCTION SYSTEM

BACKGROUND OF THE INVENTION

1. Field of the Invention

The field of the invention is indexing systems for audio reproduction systems, more particularly such systems which indicate what portion of a magnetic recording tape is in position for audio reproduction by the audio reproduction system.

2. Description of the Prior Art

The most common indexing system currently used in audio reproduction systems which utilize magnetic recording tape is a footage indicator which mechanically measures revolutions of the drive reel of the sound reproduction system, and estimates therefrom the approximate distance of travel of the magnetic recording tape. Such systems are inherently inaccurate as the amount of tape that is wound by a revolution of a reel is dependent upon the diameter of the tape which is on the reel at that particular time.

Additionally, these indicators can only provide a relative index in that they cannot indicate any specific portion of the tape and must be arbitrarily reset to a "zero" indication whenever they are desired to be used.

Some index systems have incorporated magnetically recorded index codes on the magnetic recording tape. See U.S. Pat. No. 3,739,086 to Heather, and No. 3,851,116 to Cannon. These magnetically recorded codes take up valuable space which would otherwise be used for the recording tracks on the tape, and because they are frequency dependent, the tape must be traveling at a precise predetermined speed in order for the indexing system to be useful. This presents a problem because sound recording systems typically have at least two operating speeds. There is a fast speed which provides rapid access to various portions of the tape, and a slow speed which is used for sound recording and reproduction. Additionally some tape systems have several speeds for recording and replaying the tape. One indexing system, described in U.S. Pat. No. 3,681,524 to Nicholls, resolves this particular problem by incorporating a dual frequency code—with one code specifically for the fast travel speed of the tape and a second frequency code for the slower recording and sound reproduction speed.

There are also various systems which incorporate circuitry that count periodic signals on the recording tape. This type of system does not specifically identify particular portions of the recording tape. U.S. Pat. No. 3,192,509 to Durand et al., No. 3,237,951 to Kimberlin et al., and No. 3,344,416 to Harford disclose three such systems which photoelectrically detect and count windows in the magnetic tape. U.S. Pat. No. 3,728,685 to Stalnert discloses a system which also utilizes a counter, and photoelectrically detects markings.

Other systems identify blocks of material contained on the magnetic recording tape. One such system is disclosed in U.S. Pat. No. 3,376,564 to Holland which uses strips of conductive and insulative material to form a binary code which identifies the beginning of each song on a magnetic recording tape. The code is detected by a circuit which includes electrically conductive posts which conduct a current when they come in contact with the conductive strips. This system provides automatic location of selections on the recording tape. U.S. Pat. No. 2,782,398 to West et al. discloses a system which photoelectrically identifies blocks of magnetically recorded digital data.

Another type of tape position indicator is disclosed by U.S. Pat. No. 3,812,538 to Stone et al. in which the edge of the magnetic recording tape is marked at periodic intervals by color coded markings. When the tape is viewed on a reel, these markings appear as concentric circles. By knowing the color code or by counting the number of concentric circles one can determine the amount of tape that is on the reel.

Therefore, it would be desirable to have a tape position display system which accurately indicates the specific portion of the tape which is in position for sound reproduction, and does so without interfering with the sound reproduction system. It would be especially useful to have such a system which has a capability of displaying the tape position independently of the speed or direction of travel of the magnetic recording tape within the system.

SUMMARY OF THE INVENTION

The present invention is a new and useful tape position display system for a sound reproduction system in which magnetic recording tape has groups of coded marks which successively identify successive portions of the tape. An optical reader reads the marks as the tape travels through the sound reproduction system. A decoder decodes the coded marks and displays, in numeric form, the portion of the tape which is in position for sound reproduction. In certain embodiments, the positional display indicates the tape position in terms of the playing time of the tape; each group of coded marks is in a "mirror image" format such that the optical reader is exposed to the same sequence of marks independently of the direction of travel of the tape; and the tape position display system includes means for displaying, in alpha-numeric form, the subject matter of the recorded material which has been recorded on the portion of the tape which is in position for sound reproduction.

BRIEF DESCRIPTION OF THE DRAWINGS

FIG. 5 illustrates a portion of a magnetic recording tape having coded marks which are coded in a "mirror image", and is useful in one embodiment of the present invention.

FIG. 6 illustates a portion of magnetic playing tape having a series of successive coded marks, and is useful in an embodiment of the present invention.

DESCRIPTION OF THE PREFERRED EMBODIMENTS

Figures 1, 2:
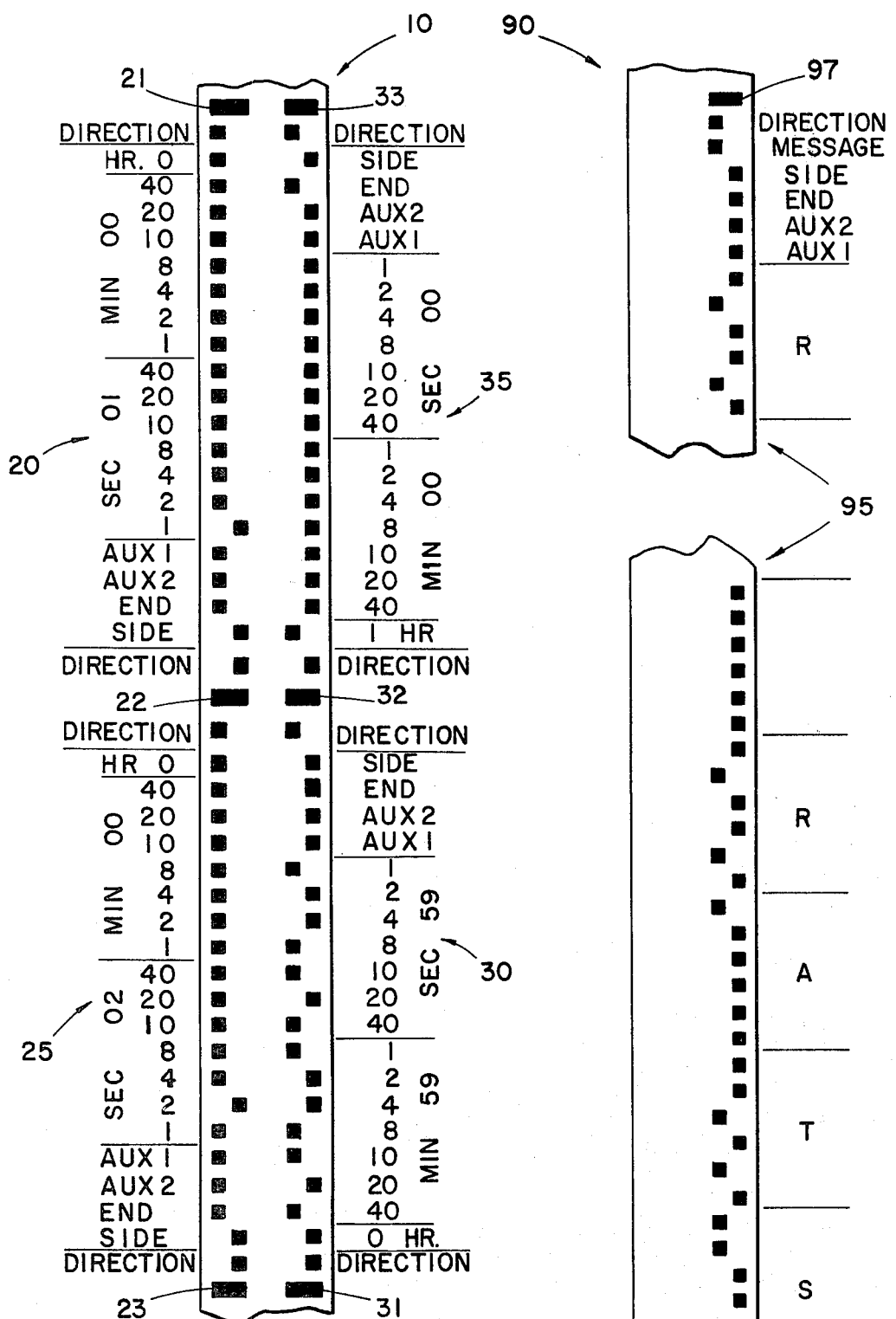
FIG. 1 illustrates a portion of magnetic recording tape having coded marks, which is useful in one embodiment of the present invention.
FIG. 2 illustrates two portions of a magnetic recording tape which have coded marks which indicate the subject matter of the material recorded on the tape, and is useful in an embodiment of the present invention.

FIG. 1 illustrates a portion of tape 10 for use in one embodiment of the present invention. On tape 10 is shown four exemplary groups of coded marks 20, 25, 30 and 35 (not to scale). Each of these groups of marks contains information with respect to position of tape 10 within a sound reproduction system (such as that disclosed in FIG. 4) incorporating the present invention.

Group of coded marks 20 has two columns. There are twenty-one data input positions. At each data input position, there is either a mark in the column closer to the edge of tape 10, which is a negative indication for the particular data input portion; or a mark in the column closer to the center of tape 10, which is a positive indication for the particular data input position. For ease of understanding, the denominations for each data input position have been noted in FIG. 1, and similar explanatory markings appear in the other figures.

The first and last data input positions for group of coded marks 20, and for each of the other groups of coded marks, are used for orientation with respect to the direction of playing or recording of the side of tape 10 to which the particular group of marks refers. A negative indication means that the marks, when viewed from that end, are encountered in the same sequence as would be encountered by the playing or recording of the side of tape 10 to which the group of marks refers. If viewed, beginning with a positive indication at the direction data input position, the coded marks will be encountered in reverse order. Surrounding each group of marks are two bar marks (21 and 22 for group of coded marks 20). These bar marks indicate both a positive and negative indication and are included to initiate an optical reader for the testing of the next data input position, which is the direction indicator. The purpose of the direction indicator marks and bar marks are to provide an easy way to determine in which sequence the coded marks are to be decoded. For this purpose, any set of marks which adequately distinguish the respective ends of the groups of coded marks would be sufficient.

From top to bottom, the second data input position indicates hours and is negative. The third through ninth data input positions indicate the number of minutes of playing time that have transpired. In order, the positive indications on these data input positions signify the transpiration of forty, twenty, ten, eight, four and one minutes. All of the indications in these data input positions are negative, and therefore zero minutes is indicated. The tenth through sixteenth data input positions signify the number of seconds in the same format as which the third through ninth data input positions signify minutes. Of these data input positions only the sixteenth data input position, for one second, is positive. Therefore, the playing time indicated by group of coded marks 20 is zero hours, zero minutes and one second, indicating the first second of playing time on the tape.

The seventeenth and eighteenth data input positions, marked AUX 1 and AUX 2 can be used for auxiliary messages. For example, these data input positions could be used to indicate the beginning of a new song on tape 10, or could be used to indicate the approaching end of the tape. The nineteenth data input position indicates whether or not the end of the tape has been reached. This indication is negative. The twentieth data input position indicates which playing side of the tape is exposed for sound reproduction by the sound reproduction system. This data input position is positive which indicates that the second side of the tape is in position for sound reproduction.

Group of coded marks 25 is in the same coded format as is group of coded marks 20, with the coded marks indicating the next second of playing time; zero hours, zero minutes, and two seconds. In this manner, it can be seen that the groups of marks successively and uniquely identify successive portions of tape 10.

Group of coded marks 30 is in the same coded format as hereinabove described for group of coded marks 20 and 25, but because groups of coded marks 30 indicates the tape position of tape 10 when the other playing side of tape 10 is in position for sound reproduction, group of coded marks 30 reads in the opposite direction to groups of coded marks 20, with direction indicator being negative at the bottom and positive at the top of the group.

From bottom to top, the second data input position for number of hours that have transpired is negatively indicated, and therefore less than an hour of playing time has transpired on the tape. The third through ninth entries have positive indications at the forty, ten, eight, and one minute positions. By taking the sum of these positive indications, it can be seen that the total number of minutes indicated is fifty-nine. The tenth through sixteenth entries for seconds also have positive indications at the forty, ten, eight and one second entry positions, indicating fifty-nine seconds. Therefore, the playing time indicated by groups of coded marks 30 is zero hours, fifty-nine minutes, and fifty-nine seconds. The auxiliary entries are not in use and are negatively indicated. Because the end of the tape has not been reached the nineteenth entry signifies a negative indication. The twentieth entry is negative, thereby indicating that this group of coded marks is in reference to side one of the tape.

Again, group of coded marks 35 is in the same coded format as the other groups of coded marks shown in FIG. 1. Group of coded marks 35 indicates 1 hour, zero minutes, and zero seconds of playing time, and also signifies the end of tape 10 by having a positive indication at the nineteenth data entry position.

Figure 3:
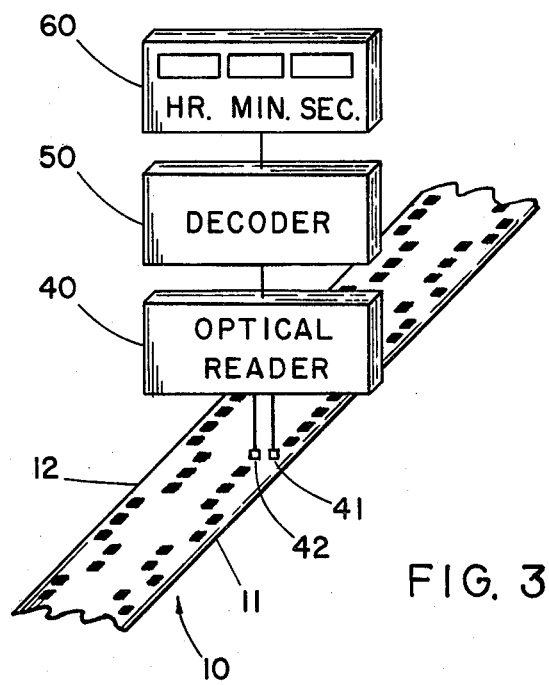
FIG. 3 is a schematic diagram of a tape position display system of the present invention.

FIG. 3 is a schematic diagram of the basic tape position display system of the present invention. Optical reader 40 has two optical sensors 41 and 42. Optical sensor 41 is closer to the edge of tape 10 than is optical sensor 42, and is positioned to read negative indications of the coded marks 11. Optical sensor 42 is positioned to read positive indications by coded marks 11. Decoder 50 is responsive to optical reader 40 and includes means to decode the informational content of markings 11. Decoder 50 identifies the portion of the tape which is in position for sound reproduction by a sound reproduction system, in numerical form, through display means 60. Markings 12 are used when the other side of tape 10 is in position for sound reproduction.

It can be seen that because the optical reader system of the present invention functions independently of the magnetic sound reproduction system, it does not interfere with the system either by taking up space on the tape which would otherwise be used for the recording tracks or by otherwise interfering with the sound reproduction. Because the optical readers can detect the marks at any reasonable speed, the tape position can be displayed irrespectively of whether the tape is traveling at a fast speed or at any one of the several slower recording and replaying speeds. And because of the direction indicator marks, which are the first and last entries for each group of marks, the coded information can be read in either direction. It is also clear that the system as described provides an accurate indication of the specific portion of playing tape that is in position for sound reproduction. No resetting of a footage indicator is required, with the exact location of the tape being indicated once a tape is moved at any speed in either direction.

The present invention is also useful to display the subject matter of the material which is recorded on a magnetic recording tape. FIG. 2 illustrates a portion of a tape useful for an embodiment of the present invention which would incorporate a subject matter display. Group of coded marks 95 on tape 90 present an example of such a message indication. The beginning and the end of the message is illustrated in FIG. 2. The marks are divided up into groups of six with various combinations of positive and negative indications identifying various letters, numerals, and punctuation marks. Viewing from bottom to top, the first five entries of this message are S, T, A, R and a blank. At the end of the message (top portion) is illustrated the final letter of the message, an R, and the auxiliary, end, and side entries.

As is the case of FIG. 1, group of marks 95 is nested by initiating bar marks 96 and 97. Also, the first and last data input positions of group of marks 95 are the direction indicator marks, which indicate the orientation of group of marks 95 with respect to the direction of travel of tape 90 within a sound reproduction when the side of tape 90 to which group of marks 95 refers is either being played or recorded. Additionally, the second and the next-to-last data entry positions are positively marked to indicate that the type of message contained in group of marks 95 is the subject matter indicating type. For embodiments of the present invention which incorporate a subject matter display, this message indicator is necessary to distinguish between the different formats for indicating tape position and indicating subject matter.

Figure 4:
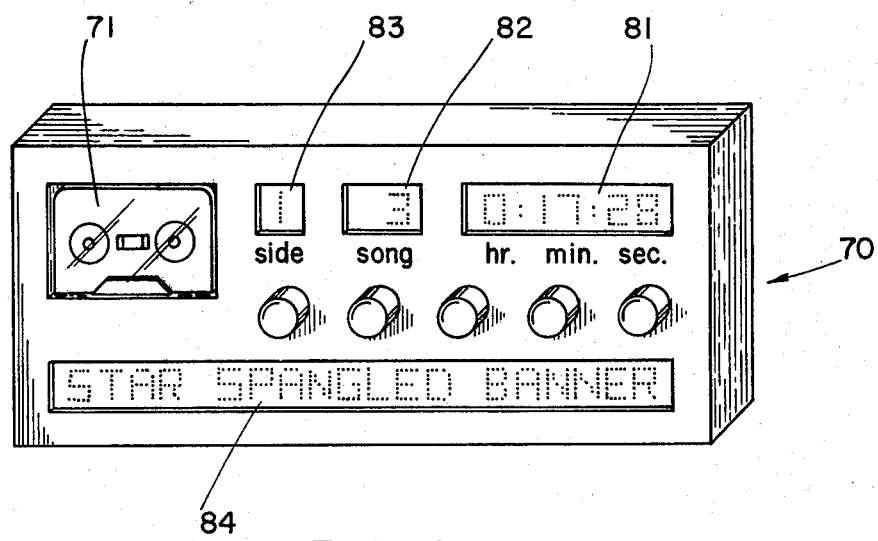
FIG. 4 illustrates an embodiment of the present invention incorporated in a sound reproduction system and including a playing time display and a subject matter display.

FIG. 4 illustrates a sound reproduction system incorporating an embodiment of the present invention which includes subject matter display. Indicated on the subject matter display 84 of sound reproduction system 70 is the song "STAR SPANGLED BANNER" which is in position for sound reproduction. Portions of this message have been illustrated in FIG. 2 and described above.

The sound reproduction system 70, as illustrated in FIG. 4, is of the "cassette" playing tape. Cassette 71 is in position for sound reproduction and has identification markings on it as described above. Sound reproduction system 70 includes the general circuitry required to translate magnetic recordings on magnetic recording tape to a sound reproduction of the material that has been recorded on a tape (not specifically shown). The tape position display system incorporated by sound reproduction system 70 includes tape playing time display 81, song number display 82, side display 83, and subject matter display 84. Also included is an optical reader, decoder, and coded magnetic tape as schematically shown in FIG. 3 (not specifically shown in FIG. 4).

FIG. 5 illustrates a portion of tape 100 which has on it coded markings which are in the same format as illustrated in FIG. 1 except that the same coded information appears twice with the second half of each message being in reverse order to the first half. The result is a "mirror image" format in which the message is symmetrical about axis 1—1 which is perpendicular to the longitudinal orientation of the tape. This variation in the format simplifies the electronic decoding circuitry in that optical sensors 41 and 42 are exposed to the same sequence of positive and negative indications irrespectively of the direction of travel of the tape. And because the orientation of the marks need not be identified, direction marks are not included, with only initiating bars 121, 122, 131 and 132 being necessary to reference the optical reader. The tape position indicated in FIG. 5 by group of marks 120 is zero hours, 30 minutes and 1 second for side 2, and the position indicated by group of marks 130 is zero hours, 29 minutes, and 59 seconds for side 1.

FIG. 6 illustrates a portion of a tape 210 having a series of tape position indication marks which successively indicates successive portions of the tape. The groups of marks, 211 through 216, are in a numerical format, requiring more sophisticated circuitry in the optical reader which would have to be of the optical character reader type. However such an embodiment of the present invention would present the advantage in that the tape position could be easily read by anyone directly by merely looking at and reading the marks. This would be helpful if someone wanted to check the position of a tape when it was not in use. The initiation and orientation of groups of marks 211 through 216 is accomplished in the same format as is described in FIGS. 1 and 2.

From the above description, it is clear that the present invention provides a tape position display system which has numerous advantages. In addition to its application as a convenience for listeners of home entertainment systems, it would also be useful in the recording industry where various segments are being recorded over a taped accompaniment. The present invention could also be integrated with a song selection system, such as that described in the Holland patent.

Also, it should be noted that specific details with respect to the tape and tape system of the present invention are intended to be exemplary in nature. For instance, the size, shape, or spacing of the marks can be altered and still fall within the spirit of the invention. And other codes than those described can be used as well. Therefore, while there have been described above the principles of this invention in connection with specific apparatus and techniques it is to be clearly understood that this description is made only by way of an example and not as limitation to the scope of the invention.

What is claimed is:

1. In a sound reproduction system, including means for audibly reroducing sound that has been magnetically recorded on magnetic recording tape, a tape position display system comprising:

(a) a magnetic recording tape having audio signals magnetically recorded thereon, said tape having portion-indicating groups of coded marks of different optical characteristics than other areas of said tape which successively and uniquely identify portions of tape in successive increments, said tape further having subject-matter-indicating groups of coded marks which indentify the subject matter of the sound that has been magnetically recorded on said tape;

(b) an optical reader, said reader being sensitive to said marks and positioned to read said marks when said tape is in position for sound reproduction by said sound system; and (c) decoder means for responding to said optical reader and for identifying in numerical format the portion of said tape that is in position for sound reproduction by said sound system as said tape is passing said optical reader, said decoder means further including means for identifying in alphanumeric format the subject matter of the sound that has been recorded on the portion of said tape that is in position for sound reproduction by said sound reproduction system.

* * * * *